(12) United States Patent
Madala (10) Patent No.: US 9,596,837 B2
(45) Date of Patent: Mar. 21, 2017

(54) FLOW-THROUGH FISHING LURE WITH MOVABLE CAGE MEMBERS

(71) Applicant: William G. Madala, Racine, WI (US)

(72) Inventor: William G. Madala, Racine, WI (US)

( * ) Notice: Subject to any disclaimer, the term of this patent is extended or adjusted under 35 U.S.C. 154(b) by 157 days.

(21) Appl. No.: 14/495,823

(22) Filed: Sep. 24, 2014

(65) Prior Publication Data

US 2016/0081316 A1 Mar. 24, 2016

(51) Int. Cl.
*A01K 85/00* (2006.01)
*A01K 83/00* (2006.01)

(52) U.S. Cl.
CPC .............. *A01K 85/00* (2013.01); *A01K 83/00* (2013.01)

(58) Field of Classification Search
CPC ...................................... A01K 85/00
USPC ........................................ 43/42.06
See application file for complete search history.

(56) References Cited

U.S. PATENT DOCUMENTS

| | | |
|---|---|---|
| 994,927 A | 6/1911 | Jefferson |
| 1,913,362 A * | 6/1933 | Catarau ................. A01K 85/01 43/42.06 |
| 2,465,127 A | 3/1949 | Stark |
| 2,546,772 A | 3/1951 | Neff |
| 2,983,065 A | 5/1961 | Ferguson et al. |
| 3,087,273 A * | 4/1963 | Nurme .................. A01K 85/16 43/42.06 |
| 4,205,476 A * | 6/1980 | Hsu ....................... A01K 85/16 43/42.06 |
| 4,711,595 A | 12/1987 | Magid et al. |
| 5,125,182 A | 6/1992 | Holder |
| 5,224,285 A * | 7/1993 | Kamin .................. A01K 85/01 43/17.6 |
| 5,319,875 A | 6/1994 | Brandolino |
| 6,115,956 A | 9/2000 | Firmin |
| 2006/0005456 A1* | 1/2006 | Harris ................... A01K 91/06 43/42.06 |
| 2006/0143971 A1 | 7/2006 | Mitchell et al. |
| 2006/0174534 A1* | 8/2006 | Melhorn ............... A01K 91/06 43/42.06 |
| 2008/0190010 A1 | 8/2008 | Neal |
| 2014/0324625 A1* | 10/2014 | Smith ................... A01K 85/01 705/26.7 |

* cited by examiner

*Primary Examiner* — Kristina Junge
(74) *Attorney, Agent, or Firm* — Jansson Munger McKinley & Kirby Ltd.

(57) ABSTRACT

A fishing lure including a head portion and a flow-through appendage cavity portion, the head portion including two first securement surfaces and the cavity portion being securable to the head portion, the cavity portion including a pair of cavity-forming cage members, each cage member including a head-portion-abutting edge, a tail end and a second securement surface engageable with one of the first securement surfaces, at least one of the cage members including openings disposed to permit flow-through of fluid while preventing pass-through of fish-attracting pieces bigger than the openings, the cavity portion further including a hinge or other connector such that the cage members are movable between together and apart positions.

15 Claims, 11 Drawing Sheets

FLOW-THROUGH FISHING LURE WITH MOVABLE CAGE MEMBERS

FIELD OF THE INVENTION

This invention relates to sport fishing, and, more specifically, to the field of fishing lures and baits for attaching fish.

BACKGROUND OF THE INVENTION

The challenge of attracting fish with lure and bait goes back millennia and has spawned much invention among fishermen and makers of tackle. For fishermen not content to adorn the end of their line with simple sinker and hook, non-disposable artificial lures of immense variety are known in the art. Most have no provision at all for bait, such as organic or animal mater, and instead depend on visual attractiveness. However, some non-disposable artificial lures have been developed with means for temporary attachment or enclosure of bait, such as animal or other organic matter, which provides non-visual sensory attractiveness to fish. It is improvement in this sort of fishing lure to which the present invention is directed.

The variety of available fishing lures for use at the end of a fishing line has increased with the availability and affordability of modern methods for fabricating and shaping materials—for example, metal and plastic—used in lures. Despite notable creativity in this area in recent decades, room for invention is far from exhausted.

Particular need exists for an attractive non-disposable lure that is capable of securely enclosing bait, large or small, while permitting natural flow of water through the bait-enclosing part of the lure, and wherein the bait-enclosing means provides for quick, simple and clean insertion, enclosure, removal and replacement of bait, facilitating clean and efficient switching of bait by the fisherman without switching lures, and which also serves effectively as a fish-attracting lure even in the absence of any enclosed or attached bait. These several advantages are the objects of the present invention.

This invention is an improvement in William G. Madala's fishing lure which is the subject of his co-pending U.S. patent application Ser. No. 14/034,596, filed on Sep. 24, 2013. Such fishing lure includes (1) a head portion and (2) at least one flow-through appendage cavity portion secured to the head portion. More specifically, the head portion has a first securement surface and the cavity portion has a second securement surface, such securement surfaces being configured and dimensioned so that they are engageable with one another to secure the cavity portion to the head portion. If there is more than one cavity portion, each cavity portion has a second securement surface to engage a corresponding first securement surface of the head portion. The fishing lure also has a hook or other fish-catching member; the hook or other fish-catching member is preferably attached to the head portion of the fishing lure, typically in some dangling fashion.

The flow-through appendage cavity portion, or more accurately each flow-through appendage cavity portion, includes: an open front end and at such location its corresponding second securement surface; a closed tail end; and a substantially rigid sidewall between the front end and the tail end, the sidewall including a plurality of sidewall openings disposed to permit flow-through of fluid (water) while preventing pass-through of solids dimensioned greater than the widest sidewall opening. The cavity of the flow-through cavity portion is configured to hold bait inserted therein by the user, such that when the fishing lure is in the water, either still or moving through the water, the fish-attracting constituents of such bait emanate from the fishing lure, by virtue of its flow-through characteristic, and increase the attractiveness of the fishing lure to fish in the area.

In certain preferred embodiments, the sidewall of the flow-through appendage cavity is of wire mesh and the sidewall openings are apertures defined by intersecting wires of the mesh. Preferably, such sidewall includes many hundreds of sidewall openings, and the sidewall openings are sized to prevent flow-through of animal matter usable as fishing bait. Most preferably, the widest sidewall opening is less than about 2 mm in width.

It is highly preferred that the sidewall of the cavity portion of the inventive fishing lure be hollow and tubular, providing good capacity for bait material. Such sidewall may be of cylindrical, near-cylindrical or truncated conical shape. The cross-sectional shape of the sidewall can be in a smooth circular or other smooth shape.

In certain preferred embodiments, the sidewall of the flow-through cavity portion includes at least one longitudinal crease. Such crease may be formed by the folding of wire mesh material or may be formed by the joining together of free edges of a piece of wire mesh material, for example, such that there are two "creases"—one resulting from folding of wire mesh material and a generally parallel one from the joining of edges. In certain embodiments having at least one sidewall crease, the sidewall includes two opposing interior surfaces that meet at such at least one longitudinal crease and define an angle of 90° or less.

In certain preferred embodiments of such fishing lure, the head portion includes a marking, coloring or shape feature simulating an eye or other animal head part. This is believed to create visual interest for fish to go along with the non-visual sensory attractiveness provided by the bait or other material contained within the flow-through cavity portion.

In some preferred embodiments, the tail end of the of the cavity portion of the fishing lure also includes a capping element. The capping element is preferably manually removable by the user to open the closed tail end.

In some of such embodiments, at least one of the sidewalls and the capping element includes a marking, an applied coloring, an infused coloring or a shape feature simulating an animal body part. This marking, coloring and/or shaping is/are believed, as with respect to markings and features added to the head portion, to create visual interest for fish to go along with the non-visual sensory attractiveness provided by the bait or other material contained within the flow-through cavity portion.

Attachment and detachment of the flow-through cavity portion of the fishing lure from the head portion or, more accurately, opening and closing the cavity of the cavity portion, are preferably facilitated by the nature of the structure. There are various preferred structures for these purposes.

In certain highly preferred embodiments, the flow-through cavity portion is screwably attachable/detachable with respect to the head portion. In such cases, the first and second securement surfaces include corresponding threads.

In another preferred embodiment, the head portion and the cavity portion are attached to each other by a hinge, with one of the first and second securement surfaces of such portions including a latch and the other of the first and second securement surfaces including a latch-catch. The latch and the latch-catch define a point of securement after the cavity portion has bait or other material inserted in it.

In still other preferred embodiments, the first and second securement surfaces of the head portion and cavity portion, respectively, are frictionally engageable. In one highly preferred embodiment, the first and second securement surfaces are configured and arranged to be snap-engageable.

As already stated or implied above, some embodiments of such fishing lure include a plurality of flow-through appendage cavity portions. In such cases, the head portion includes a plurality of securement surfaces for simultaneous securing a corresponding plurality of cavity portions to the head portion.

Another aspect of such fishing lure is a flow-through appendage cavity member for a fishing lure, the cavity member including: an open end having a securement surface for securement to another portion of the fishing lure; a closed end; and a substantially rigid sidewall between the two ends which has a plurality of sidewall openings disposed to permit flow-through of fluid while preventing pass-through of solids dimensioned greater than the widest sidewall opening.

Another aspect of such fishing lure is that it includes: a first body portion that has a first securement surface; and at least one flow-through cavity portion appended to the first body portion, the cavity portion including (a) an opening and a second securement surface engageable with the first securement surface, (b) a substantially rigid sidewall, the sidewall including a plurality of sidewall openings disposed to permit flow-through of fluid while preventing pass-through of solids dimensioned greater than the widest sidewall opening.

As noted, the present invention is an improvement of such innovative lures.

SUMMARY OF THE INVENTION

The fishing lure of the present invention is, as indicated, of the type for replaceably enclosing fish-attracting pieces. The lure includes: a head portion including two first securement surfaces; and a flow-through appendage cavity portion securable to the head portion, the cavity portion including (a) a pair of cage members together forming a cavity, each cage member including a head-portion-abutting edge, a tail end and a second securement surface engageable with a respective one of the first securement surfaces, and (b) a hinge joining the cage members, the cage members being movable about the hinge between a shut position forming the cavity for enclosing the fish-attracting pieces and an unshut position wherein the cage members are spread for loading and unloading the fish-attracting pieces, at least one of the cage members including a plurality of openings disposed to permit flow-through of fluid while preventing pass-through of fish-attracting pieces dimensioned greater than each of the openings. The hinge is preferably located at the tail ends of the cage members.

In highly-preferred embodiments, at least one of the second securement surfaces is snap-engageable with the respective one of the first securement surfaces. Most preferably, each of the second securement surfaces is snap-engageable with the respective one of the first securement surfaces. In some of such embodiments, the head portion includes two holes, a circumferential portion of each hole defining part of one of the first securement surfaces, and each cage member preferably includes an arm extending from the head-portion-abutting edge of the cage member in a direction away from the tail end of the cage member, the arm including a distal end portion which includes the second securement surface of the cage member.

In certain preferred embodiments, at least one of the distal end portions defines part of a shape or color feature simulating an eye or other animal head part. In some embodiments, at least one of the holes defines part of a shape or color feature simulating an eye or other animal head part. Each arm is preferably of a substantially-rigid, resiliently-bendable plastic material.

Each of the cage members preferably includes a plurality of openings disposed to permit flow-through of fluid while preventing pass-through of fish-attracting pieces dimensioned greater than each of the openings. The cage members are preferably substantially identical to each other in shape, and in each cage member the plurality of openings includes a series of slits which are most preferably parallel to each other. For some preferred embodiments, in each cage member, the plurality of openings includes two series of slits and the cage member includes a sternum-like support piece therebetween, the slits of each series being parallel to each other and perpendicular to the support piece.

The fishing lures of this invention are preferably made of substantially-rigid, resiliently-bendable plastic material. It is particularly preferred that the cage members and the hinge be an integral piece of such material. A wide variety of polymeric materials is available, which can provide the substantially-rigid, resiliently-bendable qualities referred to above, and such materials would be familiar to those skilled in the art who have been made aware of this invention.

It is preferred that, when the cavity portion is in the shut position, it has substantially-round cross sections along its length. Most preferably, the cross sections are progressively smaller at positions progressively closer to the tail ends.

More broadly considered, the present invention includes: a head portion including two first securement surfaces; and a flow-through appendage cavity portion securable to the head portion, the cavity portion including (a) a pair of cage members together forming a cavity, each cage member including a head-portion-abutting edge, a tail end and a second securement surface engageable with a respective one of the first securement surfaces, and (b) a connector between the cage members such that the cage members are movable between together and apart positions for respectively enclosing and loading the fish-attracting pieces, at least one of the cage members including a plurality of openings disposed to permit flow-through of fluid while preventing pass-through of fish-attracting pieces dimensioned greater than each of the openings. The connector is preferably a hinge, but a wide variety of connecting structures may be used.

The innovative fishing lure of the present invention has substantial advantages of a type particularly appreciated by certain fishermen. Such innovative fishing lure increases ease of use of fishing materials which attract fish using organic or inorganic fish-attracting pieces, and has the effect of increasing public interest and enjoyment in the sport of fishing. The fishing lure of this invention also has the advantage of being easy to manufacture.

BRIEF DESCRIPTION OF THE DRAWINGS

For thoroughness of understanding of the present invention, the figures of the co-pending application are included herein, followed by FIGS. 17-24, which illustrate embodiments of the most recent improvements. The figures include.

DETAILED DESCRIPTION OF THE SUBJECT FISHING LURES

The figures illustrate a number of embodiments of the subject fishing lures. Like numbers are used for parts and portions of the embodiments shown if the parts and portions are substantially similar.

FIGS. 1-4 and 6 illustrate a fishing lure 10. Fishing lure 10 includes a head portion 12 and a flow-through appendage cavity portion 14 secured to the head portion. Head portion 12 has a line-connector eyelet 16 at its front end and a dangling three-prong hook element 18 secured to its side near the rear thereof, so that hook element 18 dangles alongside cavity portion 14 when fishing lure 10 is pulled through the water.

Figures 1, 2, 3:
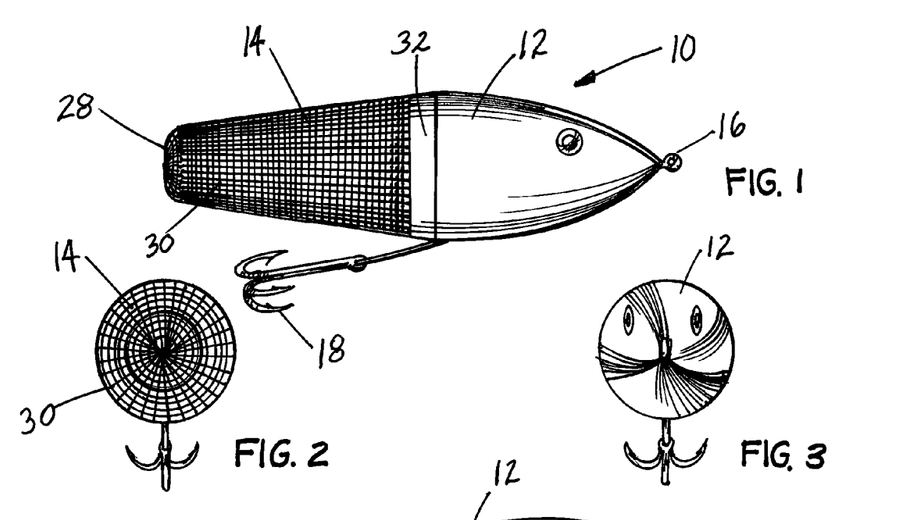
FIG. 1 is a side elevation of a fishing lure.
FIG. 2 is a rear elevation of the fishing lure of FIG. 1 or, stated differently, a left side view of the device of FIG. 1.
FIG. 3 is a front elevation of the fishing lure of FIG. 1 or, stated differently, a right side view of the device of FIG. 1.

Head portion 12, sometimes referred to herein as first body portion, is not given the name head portion because it may replicate the head of a fanciful creature, although it may be made to appear like a creature's head or to include a creature's head or to include features such as eyes which would be representative of a fanciful creature. In the embodiment illustrated, head portion 12 is the front or lead portion of fishing lure 10 as it is pulled through the water on a line. But other arrangements are also contemplated.

Figure 6:
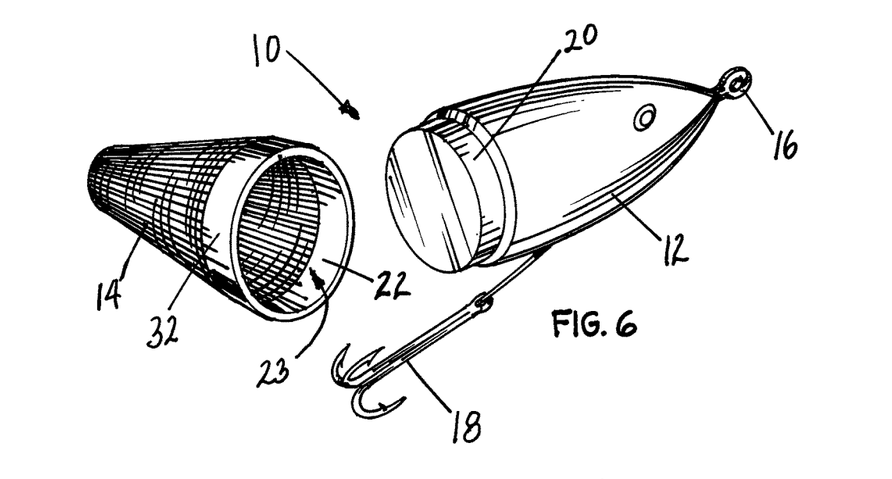
FIGS. 6-8 are perspective views of fishing lures generally like that of FIG. 1, but illustrating different forms to achieve removable engagement of the cavity portion with the head portion, allowing complete disengagement of the cavity portion from the head portion.

As shown best in FIG. 6, head portion 12 has a first securement surface 20 at its rear end and cavity portion 14 has a second securement surface 22 at its forward end. Second securement surface 22 extends around filling opening 23 of cavity portion 14. First and second securement surfaces 20 and 22 are configured to be tightly frictionally engageable. When disengaged, the cavity formed by cavity portion 14 can be loaded with bait material, whether animal material, other organic material, or any material that would provide non-visual sensory attractiveness by emissions while fishing lure 10 is pulled through the water. When engaged, the loaded material is not only retained, but head portion 12 and cavity portion 14 together form a completed fishing lure body. The frictional engagement of first and second securement surfaces 20 and 22 can be aided in any way desired, including any mechanical means.

Figure 7:
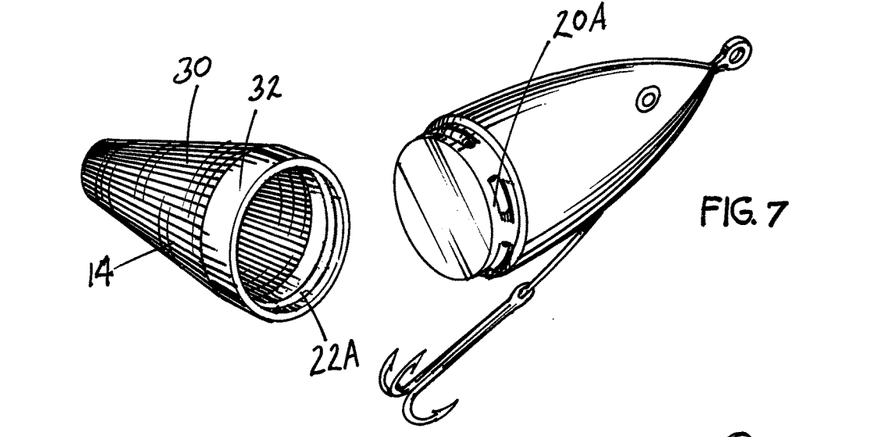
Figure 8:
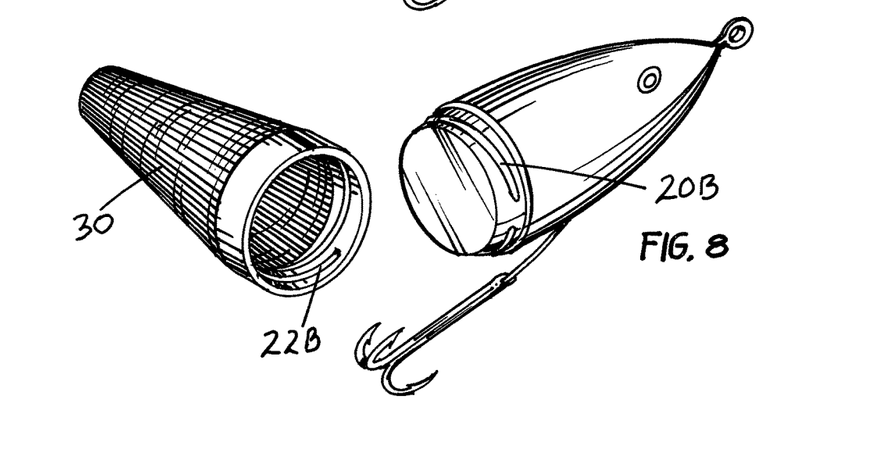
Figure 9:
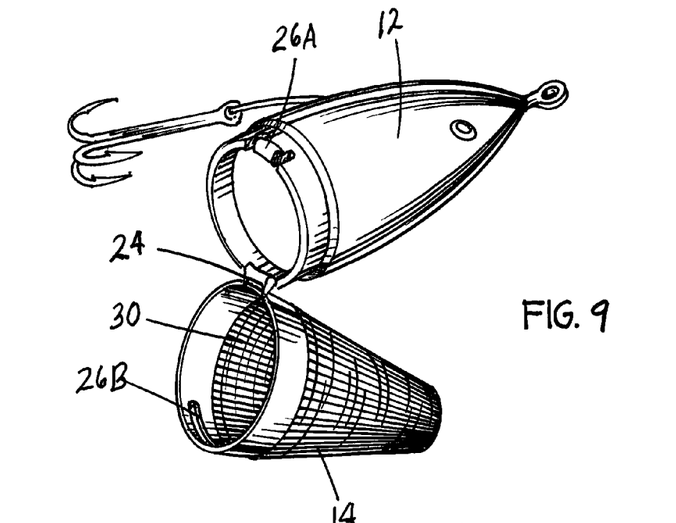
FIG. 9 is a perspective view of an alternative embodiment in which the cavity portion is hinged to the head portion, the fishing lure being shown in the full open position.

FIGS. 7-9 illustrate alternative first and second engagement surfaces for releaseable engagement of cavity portion 14 to head portion 12. FIG. 7 shows snap-engagement surfaces 20A and 22A, while FIG. 8 shows screw engagement surfaces 20B and 22B. FIG. 9 illustrates an embodiment in which the head and the cavity portions are attached to one another by a hinge 24, with the head portion having a latch 26A and the cavity portion having a latch-catch 26B. Latch 26A and latch-catch 26B provide secure closure of cavity portion after bait or other material is inserted into the cavity formed by the cavity portion. Using a hinging device keeps the head and cavity portions together even when the device is opened for loading or unloading purposes.

Flow-through appendage cavity portion 14 also has a closed tail (or rear) end 28. Between tail end 28 and the front end of cavity portion 14 where opening 23 is located, cavity portion 14 has a substantially rigid sidewall 30 extending along the length of cavity portion 14. Sidewall 30, and also rear end 28, are a substantially rigid wire-mesh structure. The term "substantially rigid" as used herein means that the structure has fixed form and shape, rather than being collapsible, such as a bag or the like. Thus, cavity portion 14 together with head portion 12 makes fishing lure 10 to have a defined essentially fixed shape. The wire mesh sidewalls of cavity portion 14 are permanently attached to a rigid band 32 which forms the forwardmost portion of cavity portion 14 and forms second securement surface 22.

Figures 4, 5:
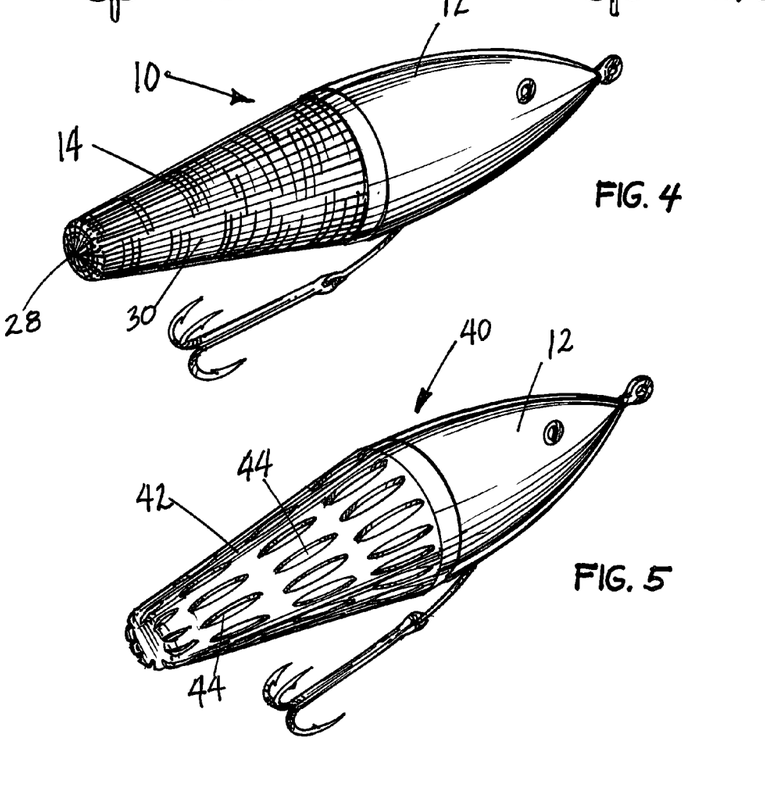
FIG. 4 is a perspective view of the fishing lure of FIG. 1.
FIG. 5 is a perspective view of an alternative embodiment.

The wire mesh structure of fishing lure 10 is perhaps best illustrated in FIGS. 1 and 2, but FIGS. 4 and 6 represent the same wire mesh, as do FIGS. 7-10 and 16 of other embodiments. The embodiment shown in FIGS. 12-15 also utilizes wire mesh for its cavity portion. The wire mesh illustrated for all such embodiments provides a great number of sidewall openings between the intersecting wires of the mesh; these openings, which are less than about 2 mm in width, serve to contain the bait or other inserted material while allowing flow-through of water and outflow of the non-visual attractant emitted from the contained material.

FIG. 5 illustrates a fishing lure 40 which is an alternate embodiment having a cavity portion 42 of rigid plastic, formed by molding or otherwise, metal or other material. Cavity portion 42 has a sidewall with a pattern of elongate flow-through openings 44 formed therein. These are sized to prevent unintentional outflow of bait or other materials inserted into the cavity within cavity portion 42.

Figure 11:
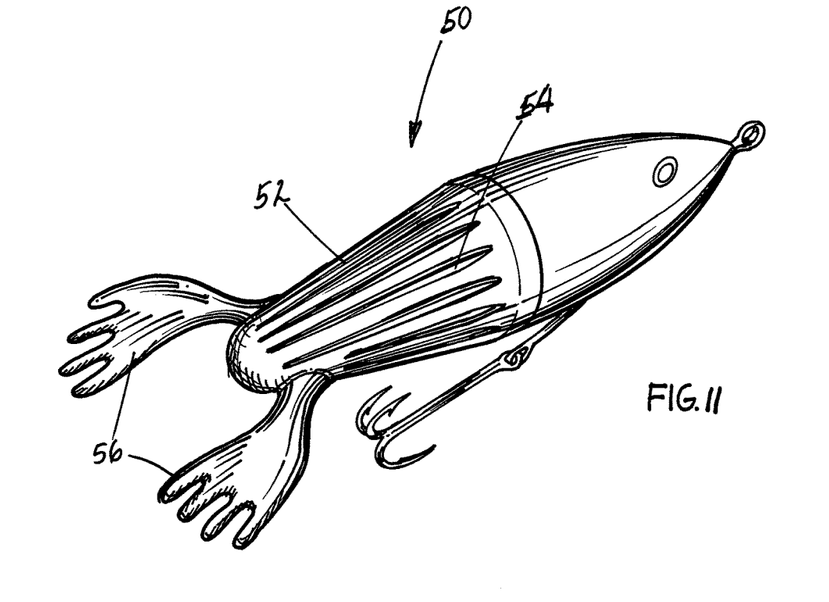
FIG. 11 is a perspective view of another embodiment.
Figure 12:
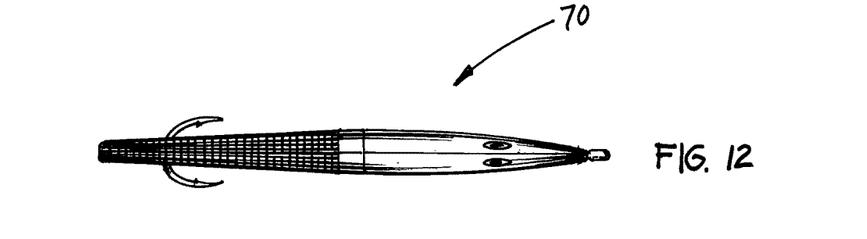
FIG. 12 is a top plan view of still another of such fishing lures.
Figures 13, 14, 15:
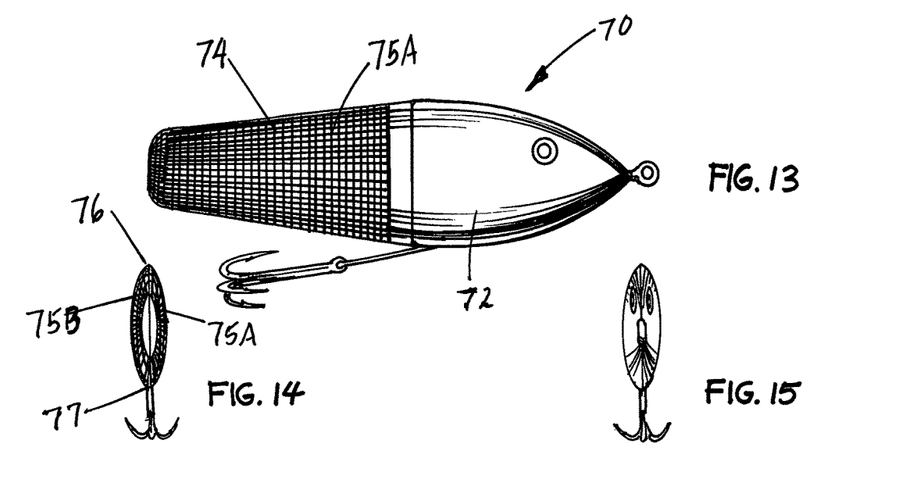
FIG. 13 is a front elevation of the fishing lure of FIG. 12.
FIG. 14 is a rear elevation of the fishing lure of FIG. 12 or, stated differently, a left side view of the device of FIG. 13.
FIG. 15 is a front elevation of the fishing lure of FIG. 12 or, stated differently, a right side view of the device of FIG. 13.

FIG. 11 illustrates a fishing lure 50 which is another alternate embodiment. Fishing lure 50 has a cavity portion 52 of plastic or other material, and has a series of longer sidewall openings 54. Cavity portion 52 of fishing lure 50 also has some frog-feet animal-like features 56 on it to add visual attractiveness. Features 56 may be of the same material as cavity portion 52, and may even be integrally formed with the remainder of cavity portion 52. Alternatively, they can be rubber-like and flexible, which may allow them to wiggle or oscillate in the water while fishing lure 50 is pulled through the water.

Figure 10:
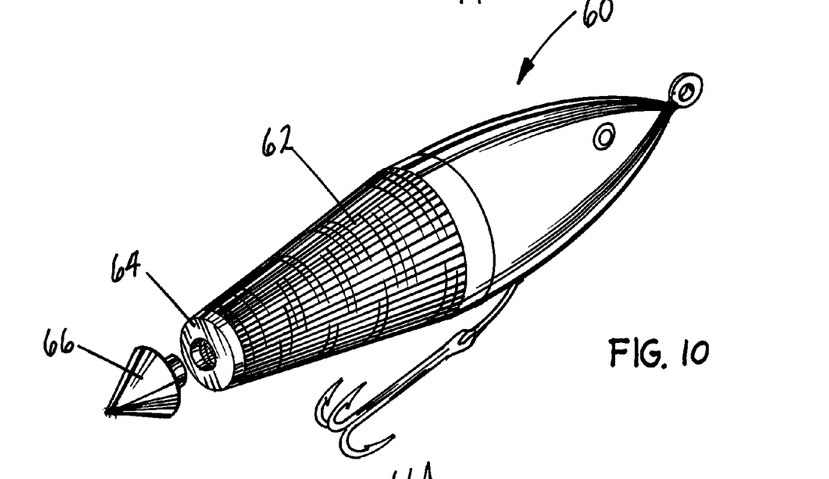
FIG. 10 is a partially exploded perspective view of a variation of the fishing lure, which includes a capping element at the rear of the cavity portion of the lure.
Figure 10A:
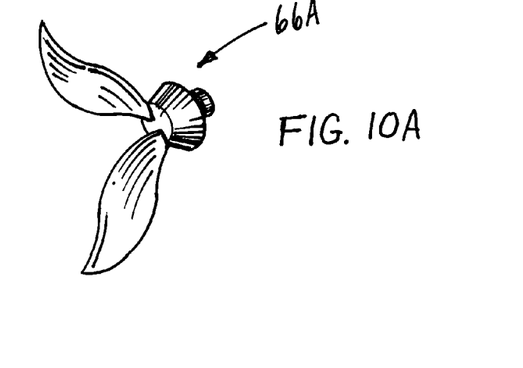
FIG. 10A is a perspective view of another rear capping element.

FIG. 10 illustrates a fishing lure 60 which is yet another embodiment. Fishing lure 60 has a cavity portion 62 which in all respects is like that of fishing lure 10, except that instead of having wire mesh at its tail end it has a rigid flat cylindrical end member 64 to which a capping member in the form of a conical pointed tailpiece 66 is attached. End member 64 can provide a rear opening or can simply provide a means for attachment of tailpiece 66. FIG. 10A illustrates another capping member, a tailpiece 66A which can be used in place of tailpiece 66. Tailpiece 66A includes flaring wing-like structures which can provide additional visual attractiveness and/or impart a propellor-like spinning motion to fishing lure 60 as it is pulled through the water. These capping members are manually removable and, if end member 64 has an opening therethrough, are additional means to open and close cavity portion 62.

FIGS. 12-15 illustrate still another embodiment, a fishing lure 70 which has a flatter configuration. More specifically, fishing lure 70 has a head portion 72 and a flow-through appendage cavity member 74 each of which is somewhat flat, such that cross-sections across either portion and at the juncture of such portions are high and narrow.

Cavity member 74 has a sidewall of substantially rigid wire mesh material, as with other embodiments illustrated herein. However, rather than having essentially round cross-sections along the length of the cavity member, the sidewall of cavity member 74 includes opposing sidewall portions 75A and 75B which come together at two longitudinal creases 76 and 77 which are spaced from one another. One of the creases may be created by the folding of the wire mesh material, and the other by the joining together of edges of the wire mesh material. Or, if the wire mesh material is provided in tube form, both creases may be the result of folding. The term "creases" as used herein does not require formation by folding. Sidewall portions 75A and 75B come together at each crease at an angle well under 90°, and sidewall portions 75A and 75B are outwardly bowed when viewed in cross-section, as can be seen best in FIG. 14. The "flatness" of cavity member 74, of course, determines the capacity of the cavity within cavity member 74. The angles between the sidewall portions and the nature of their outward bowing all have an effect on the movement of fishing lure 70 as it moves through the water.

Figure 16:
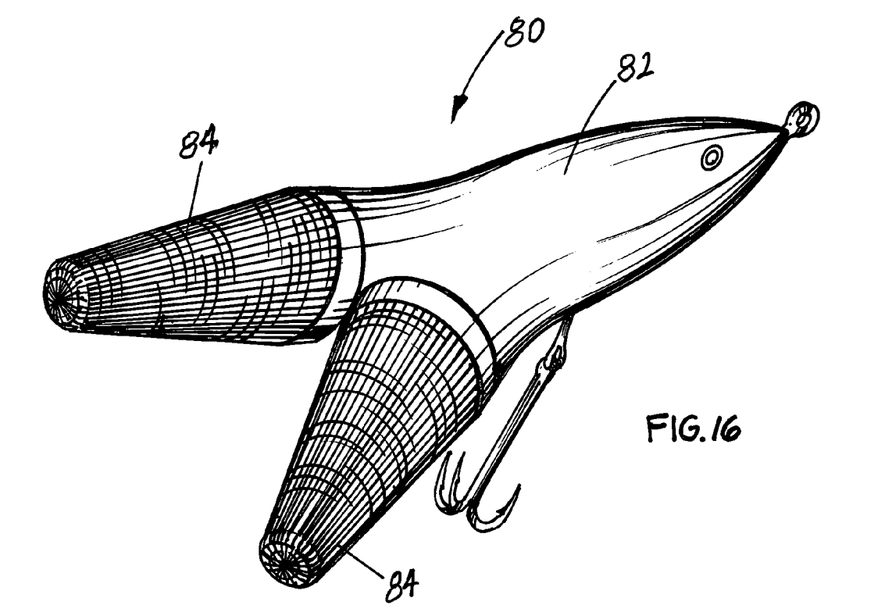
FIG. 16 is a perspective view of yet another of such fishing lures, namely, a fishing lure having two flow-through appendage cavity portions attached to a head portion adapted for such attachment.

FIG. 16 illustrates another embodiment, fishing lure 80. Fishing lure 80 differs from the other embodiments shown in that it includes a head portion 82 and two flow-through appendage cavity portions 84. Head portion 82 is designed to have two first securement surfaces each of which accommodates one of cavity portions 84. Cavity portions 84 each have a second securement surface configured for attachment to head portion 82 at one of the first securement surfaces.

All portions of such fishing lures may have shape features simulating animal body parts, applied coloring, markings, or graphic decorations of various kind, as is frequently done with fishing lures. Such features are added to create visual interest for fish to go along with the non-visual sensory attractiveness provided by the bait or other material contained within the flow-through cavity portions.

Figure 17:
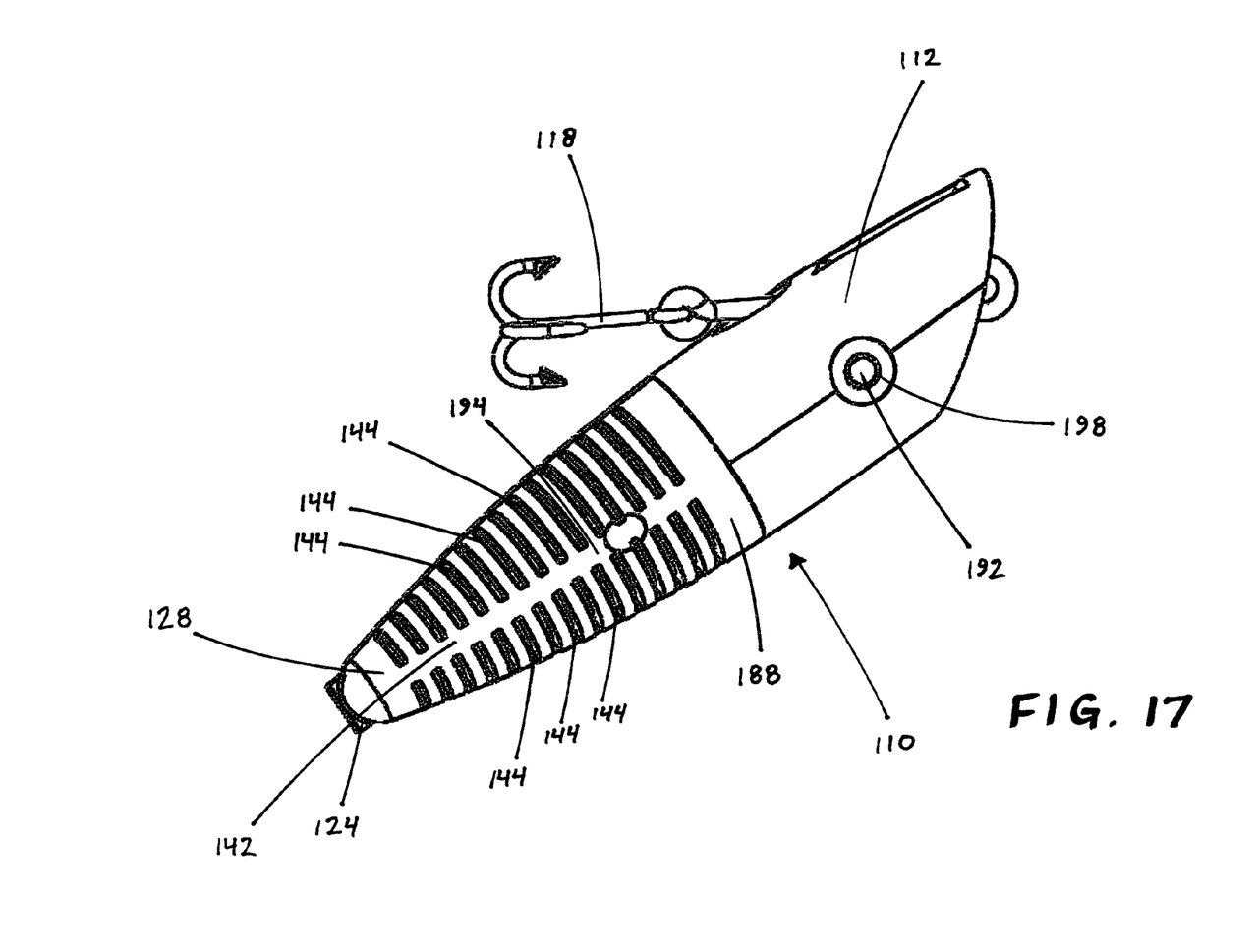
FIG. 17 is a perspective view of a fishing lure in accordance with the present invention.
Figure 18:
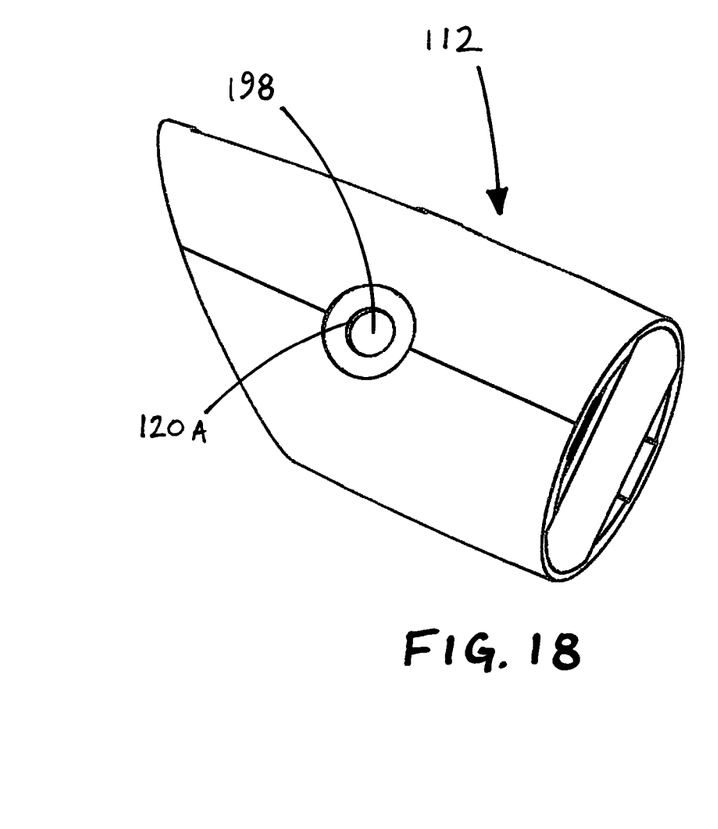
FIG. 18 is a perspective view of the head portion of the fishing lure of FIG. 17.
Figure 19:
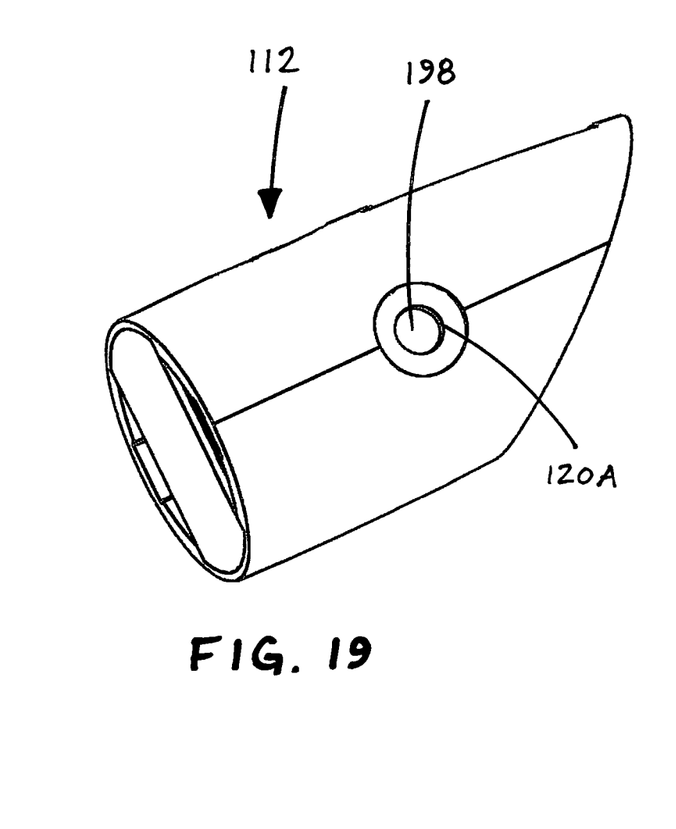
FIG. 19 is an opposite-side perspective view of the head portion of the fishing lure of FIG. 18.
Figure 20:
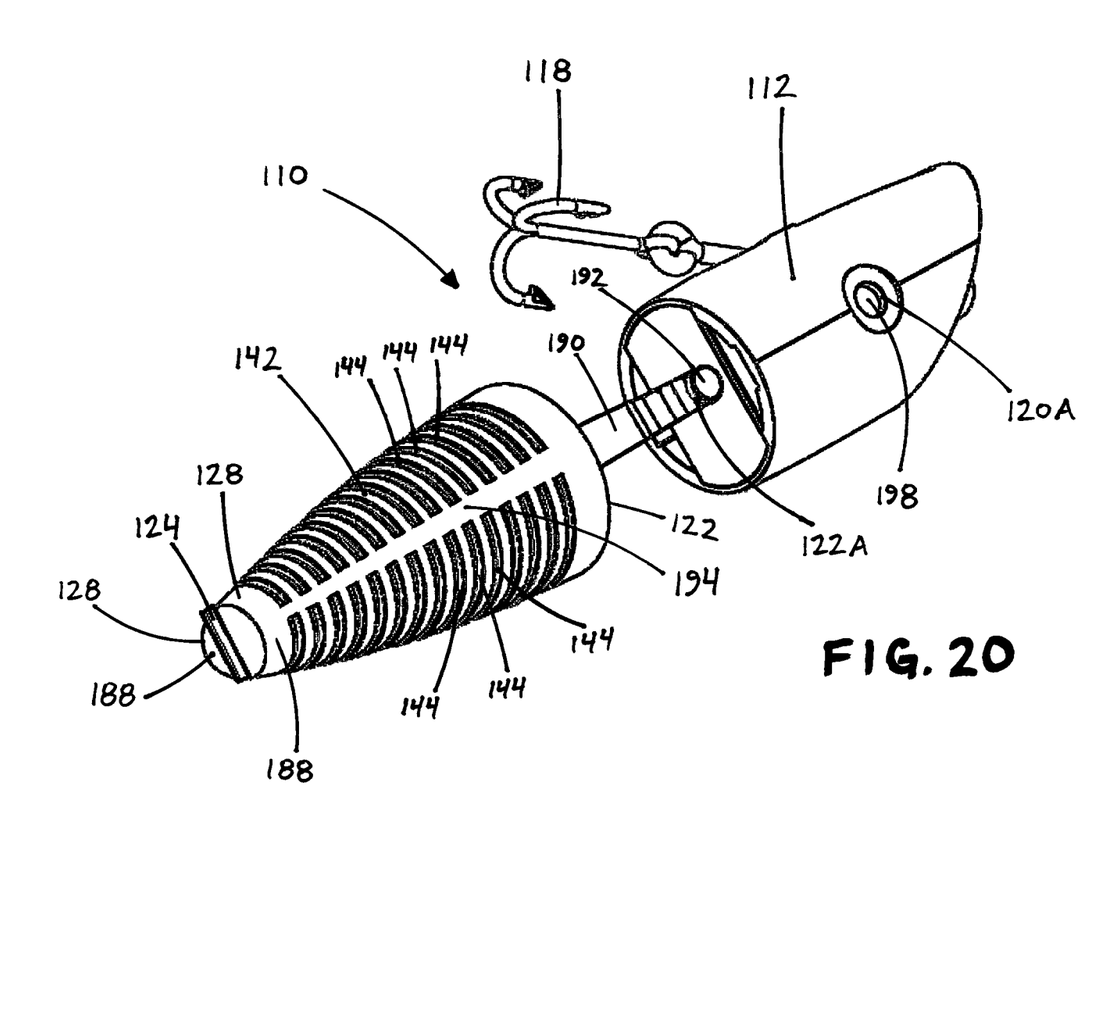
FIG. 20 is a disassembled perspective view of a fishing lure generally like that of FIG. 17, with the head portion and cavity portion ready to be snap-engaged.
Figure 21:
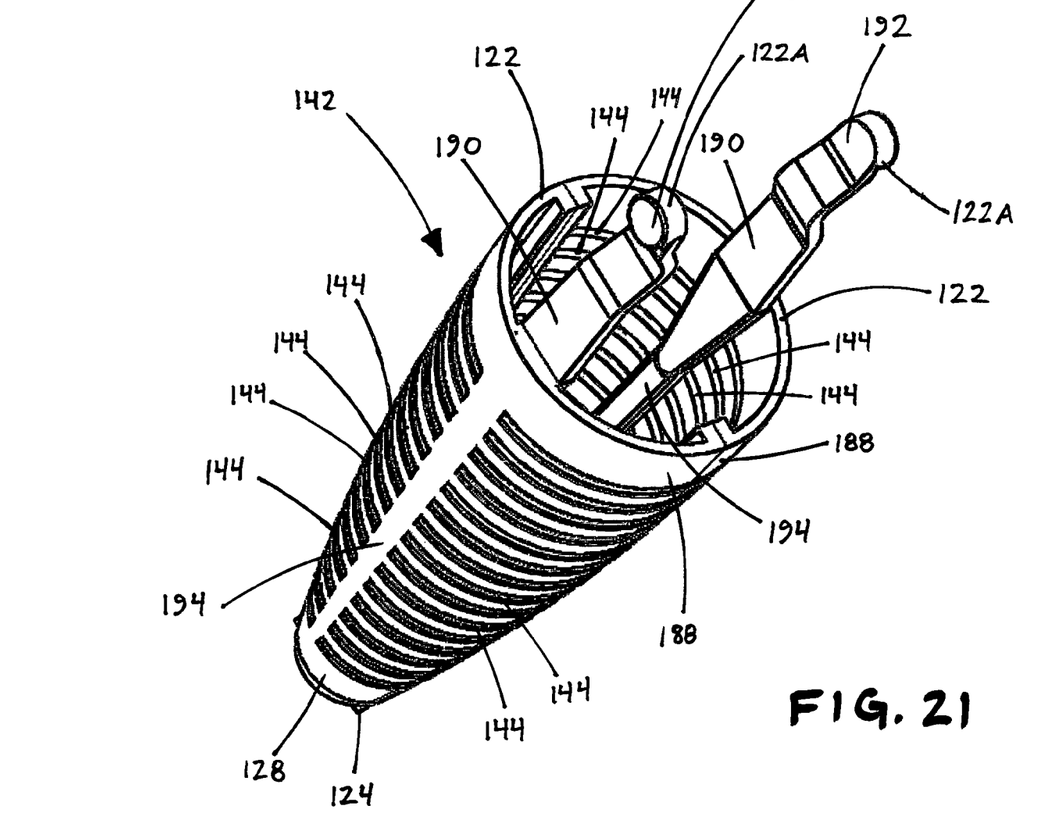
FIG. 21 is a perspective view of the cavity portion of a fishing lure generally like that of FIGS. 17 and 20.
Figure 22:
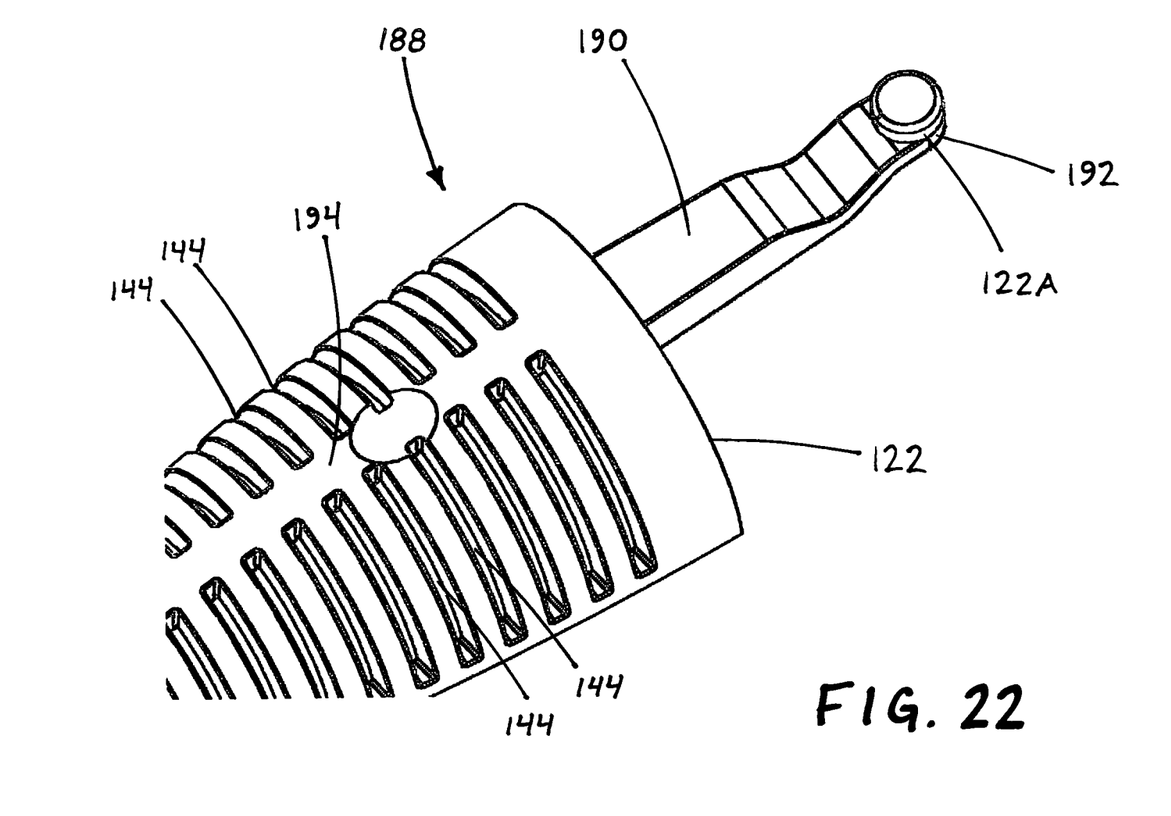
FIG. 22 is a fragmentary perspective view of one of the cage members of the fishing lure of FIG. 17.

FIGS. 17-24 illustrate fishing lure 110, which is a highly-preferred embodiment of this invention. Fishing lure 110 includes a head portion 112 and a cavity portion 142. Head portion 112 includes two first securement surfaces 120A, each of which defines a hole 198 in the wall of head portion 112. As shown in FIG. 17, a hook 118 is secured to head portion 112. Cavity portion 142 is formed of two cage members 188 which are identical to one another in shape, and cage members 188 are connected to each other by a hinge 124. As shown in the drawings, particularly FIGS. 23 and 24, cage members 188 and hinge 124 are an integral piece of material, namely a substantially-rigid, resiliently-bendable plastic material. As shown in FIG. 20, cavity portion 142 has a head-portion-abutting edge 122, which is circular and of the same size as the rearward opening edge of head portion 112. Each cage member 188 includes a forwardly-extending arm 190 which is integrally formed with the remainder of cage member 188. Each arm 190 has a distal end portion 192 which is shaped to snap into one of the holes 198 of head portion 112. Each distal end portion 192 when snap-engaged with a corresponding hole 198 of the head portion 112 simulates an eye of some purported marine animal, and each corresponding-hole-defining surface of head portion 112 likewise simulates an eye.

Each arm 190 is configured such that it is depressed inwardly upon insertion into head portion 112 and resiliently snaps outwardly for engagement with holes 198 when adjacent thereto. This secures cavity portion 142 to head portion 112 for use when fishing lure 110 is in the water to attract fish.

Each cage member 188 has two series of parallel slit-type openings 144 on either side of a sternum-like support piece 194. This is seen particularly in FIGS. 20-24.

Figure 23:
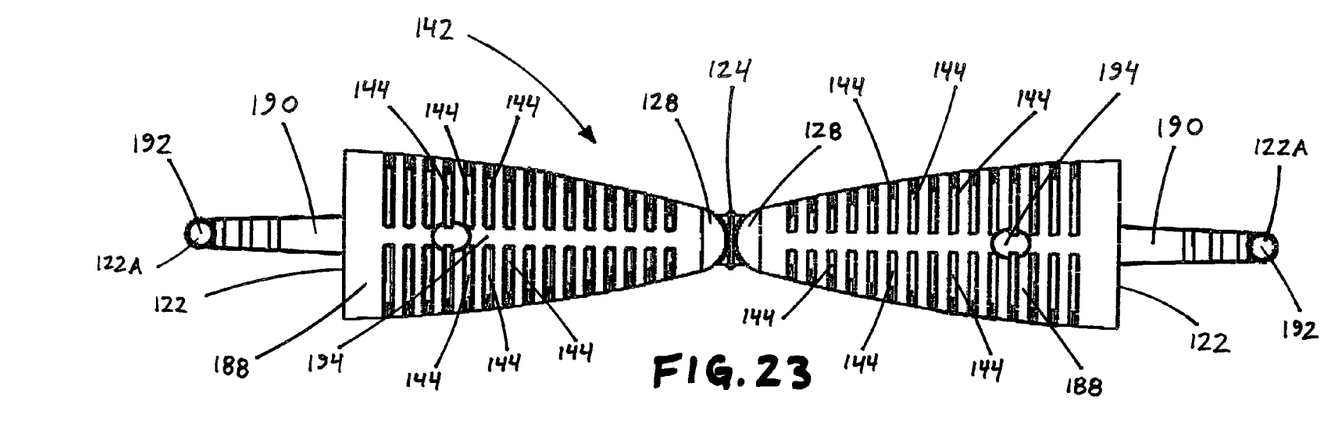
FIG. 23 is a side elevation of the exterior-side surfaces of the cavity portion (in an unshut/apart position) of the fishing lure of FIG. 17.
Figure 24:
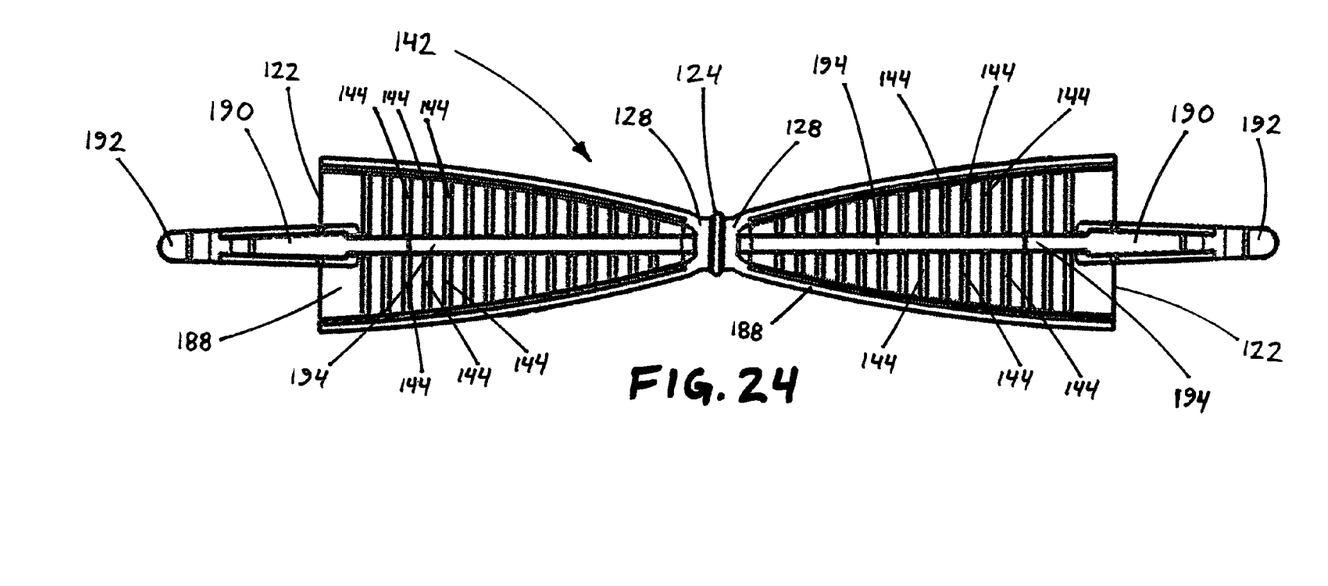
FIG. 24 is a side elevation of cavity-side surfaces of the cavity portion (in an unshut/apart position) of the fishing lure of FIG. 17.

The pair of cage members 188 defines the cavity formed by flow-through appendage cavity portion 142 of fishing lure 110 when cavity portion 142 is in a shut position as shown for example in FIG. 17. Loading fish-attracting pieces into the cavity is made simple by moving cage members 188 apart as shown in FIGS. 23 and 24. After fish-attracting pieces are placed in the cavity, cage members 188 are folded back together about hinge 124, and then cavity portion 142 is snap-engaged with head portion 112. Fishing lure 110 is then ready for use in the water to catch fish.

The subject fishing lures may be made with available materials and using known methods.

While the principles of this invention have been described in connection with specific embodiments, it should be understood clearly that these descriptions are made only by way of example and are not intended to limit the scope of the invention. Numerous alternative configurations providing all the benefits of the invention are possible.

The invention claimed is:

1. A fishing lure of the type for replaceably enclosing fish-attracting pieces, comprising:
   a head portion with an exterior surface and including two first securement surfaces, the head portion having two holes exposed at its exterior surface and each having a circumferential portion forming one of the first securement surfaces; and
   a flow-through appendage cavity portion securable to the head portion, the cavity portion including:

a pair of cage members together forming a cavity, each cage member including a tail end, a head-portion-abutting edge, and an arm extending from the head-portion-abutting edge into the head portion, the arm including a distal end portion that (a) is configured for outward insertion from inside the head portion into one of the holes for exposure thereof at the exterior surface and (b) has a second securement surface engageable with the corresponding first securement surface, and a hinge joining the cage members, the cage members being movable about the hinge between a shut position forming the cavity for enclosing the fish-attracting pieces and an unshut position wherein the cage members are spread for loading and unloading the fish-attracting pieces, and wherein, when the cage members are in the shut position, the two arms extend toward the head portion, at least one of the cage members including a plurality of openings disposed to permit flow-through of fluid while preventing pass-through of fish-attracting pieces dimensioned greater than each of the openings.

2. The fishing lure of claim 1 wherein at least one of the second securement surfaces is snap-engageable with the respective one of the first securement surfaces.

3. The fishing lure of claim 1 wherein each of the second securement surfaces is snap-engageable with the respective one of the first securement surfaces.

4. The fishing lure of claim 1 wherein part of at least one of the distal end portions defines part of a shape or color feature simulating an eye or other animal head part.

5. The fishing lure of claim 1 wherein at least one of the holes defines part of a shape or color feature simulating an eye or other animal head part.

6. The fishing lure of claim 1 wherein the hinge is located at the tail ends of the cage members.

7. The fishing lure of claim 1 wherein each cage member includes a plurality of openings disposed to permit flow-through of fluid while preventing pass-through of fish-attracting pieces dimensioned greater than each of the openings.

8. The fishing lure of claim 7 wherein the cage members are substantially identical to each other in shape.

9. The fishing lure of claim 8 wherein, in each cage member, the plurality of openings includes a series of slits, the slits of the series being parallel to each other.

10. The fishing lure of claim 8 wherein, in each cage member, the plurality of openings includes two series of slits and the cage member includes a sternum-like support piece therebetween, the slits of each series being parallel to each other and perpendicular to the support piece.

11. The fishing lure of claim 1 wherein each arm is of a substantially-rigid, resiliently-bendable plastic material.

12. The fishing lure of claim 11 wherein each cage member is of a substantially-rigid, resiliently-bendable plastic material.

13. The fishing lure of claim 12 wherein the cage members and the hinge are an integral piece of material.

14. The fishing lure of claim 13 wherein the cavity portion in the shut position has substantially-round cross sections along its length.

15. The fishing lure of claim 14 wherein the cross sections are progressively smaller at positions progressively closer to the tail ends.

* * * * *